(12) United States Patent
Tanaka et al.

(10) Patent No.: US 11,274,231 B2
(45) Date of Patent: Mar. 15, 2022

(54) STICKABLE-CURABLE ADHESIVE SHEET

(71) Applicant: NITTO DENKO CORPORATION, Ibaraki (JP)

(72) Inventors: Akiko Tanaka, Ibaraki (JP); Keisuke Shimokita, Ibaraki (JP); Kenichi Okada, Ibaraki (JP); Masayuki Minakata, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 231 days.

(21) Appl. No.: 16/069,259

(22) PCT Filed: Jan. 10, 2017

(86) PCT No.: PCT/JP2017/000446
§ 371 (c)(1),
(2) Date: Jul. 11, 2018

(87) PCT Pub. No.: WO2017/122624
PCT Pub. Date: Jul. 20, 2017

(65) Prior Publication Data
US 2019/0016925 A1 Jan. 17, 2019

(30) Foreign Application Priority Data
Jan. 15, 2016 (JP) .............................. JP2016-006033

(51) Int. Cl.
*C09J 7/10* (2018.01)
*C09J 11/06* (2006.01)
(Continued)

(52) U.S. Cl.
CPC . *C09J 7/10* (2018.01); *C09J 7/30* (2018.01); *C09J 7/38* (2018.01); *C09J 7/405* (2018.01);
(Continued)

(58) Field of Classification Search
None
See application file for complete search history.

(56) References Cited

U.S. PATENT DOCUMENTS 7,070,051 B2 * 7/2006 Kanner ............ A61B 17/06133
206/382
2003/0216519 A1 * 11/2003 Heilmann ............ C09D 201/08
525/191
(Continued)

FOREIGN PATENT DOCUMENTS

| CN | 101326422 A | 12/2008 |
| CN | 103673914 A | 3/2014 |

(Continued)

OTHER PUBLICATIONS

PCT International Preliminary Report on Patentability(Form PCT/IB/373), with PCT Notification Concerning Transmittal of International Preliminary Report on Patentability (Form PCT/IB/326) for corresponding international application PCT/JP2017/000446 dated Jul. 26, 2018.

(Continued)

*Primary Examiner* — Frank D Ducheneaux
(74) *Attorney, Agent, or Firm* — Hauptman Ham, LLP

(57) ABSTRACT

A stickable-curable adhesive sheet bonds a deformation/conversion device to an adherend. The stickable-curable adhesive sheet contains a stickable-curable adhesive component and a curing component curing the stickable-curable adhesive component. The stickable-curable adhesive component has pressure-sensitive adhesiveness before curing and the initial tensile elastic modulus at 25° C. of the stickable-curable adhesive sheet after curing is $5 \times 10^8$ Pa or more.

3 Claims, 7 Drawing Sheets

(51) Int. Cl.
| | |
|---|---|
| *C09J 201/00* | (2006.01) |
| *C09J 7/38* | (2018.01) |
| *C09J 7/30* | (2018.01) |
| *C09J 163/00* | (2006.01) |
| *C09J 7/40* | (2018.01) |

(52) U.S. Cl.
CPC ............ *C09J 11/06* (2013.01); *C09J 163/00* (2013.01); *C09J 201/00* (2013.01); *C09J 2301/302* (2020.08); *C09J 2301/312* (2020.08); *C09J 2433/00* (2013.01); *C09J 2463/00* (2013.01)

(56) References Cited

U.S. PATENT DOCUMENTS

| | | | |
|---|---|---|---|
| 2009/0090462 A1* | 4/2009 | Kato | H05K 9/0096 156/249 |
| 2009/0205443 A1 | 8/2009 | Takeuchi et al. | |
| 2011/0049446 A1* | 3/2011 | Ishida | C09B 23/0066 252/586 |
| 2013/0165603 A1 | 6/2013 | Wi et al. | |
| 2014/0158300 A1 | 6/2014 | Hayata et al. | |
| 2015/0184034 A1 | 7/2015 | Taniguchi et al. | |
| 2016/0032157 A1 | 2/2016 | Hoshi et al. | |
| 2019/0010361 A1* | 1/2019 | Hoshi | C09J 163/00 |

FOREIGN PATENT DOCUMENTS

| | | |
|---|---|---|
| CN | 104033457 A | 9/2014 |
| CN | 104968745 A | 10/2015 |
| EP | 2871219 A1 | 5/2015 |
| EP | 3375833 A1 | 9/2018 |
| JP | 02-080476 A | 3/1990 |
| JP | 11-181361 A | 7/1999 |
| JP | 2013-006974 A | 1/2013 |
| JP | 2015-087351 A | 5/2015 |
| JP | 2015-212359 A | 11/2015 |
| TW | 201311853 A1 | 3/2013 |

OTHER PUBLICATIONS

PCT International Preliminary Report on Patentability (Form PCT/IB/373), with PCT Notification of Transmittal of Translation of the International Preliminary Report on Patentability (Form PCT/IB/338) for corresponding international application PCT/JP2017/000446 dated Jul. 17, 2018.

International Search Report for corresponding international application PCT/JP2017/000446 dated Feb. 21, 2017, citing the above references.

Japanese Office Action dated Jun. 5, 2018 for corresponding Japanese Application No. 2016-006033, citing the above references.

The extended European search report dated Dec. 4, 2019 for corresponding European Application No. 17738378.3, citing the above references.

Office Action issued for corresponding Chinese Patent Application No. 201780006761.X dated Jul. 3, 2020, along with an English translation, citing above references.

Maziar Moradi et al., "Strain Transfer Analysis of Surface-Bonded MEMS Strain Sensors", IEEE Sensors Journal, vol. 13, No. 2, Feb. 2013, pp. 637-643, cited in NPL No. 1.

Office Action issued for corresponding Taiwanese Patent Application No. 106101153 dated Jul. 30, 2020, along with an English translation, citing above references.

Shou MA et al., "The bonding process of fiber bragg grating (FBG) sensors in the metal specimens", Acta Materiae Compositae Sinica, vol. 30, Suppl., Dec. 2013, pp. 251-254.

Jun WU et al., "Influence of bond layer characteristics on strain sensing properties of FBG sensors", Optics and Precision Engineering, 19(12), Dec. 2011, pp. 2941-2946.

Office Action issued for corresponding Taiwanese Patent Application No. 106101153 dated Feb. 4, 2021, along with an English translation.

* cited by examiner

Lengthwise direction

Upper side

Lower side

STICKABLE-CURABLE ADHESIVE SHEET

CROSS REFERENCE TO RELATED APPLICATIONS

This application claims the priority of Japanese Patent Application No. 2016-006033, filed on Jan. 15, 2016, in the Japanese Patent Office. Further, this application is the National Phase application of International Application No. PCT/JP2017/000446 filed on Jan. 10, 2017, which is incorporated herein by reference in its entirety.

TECHNICAL FIELD

The present invention relates to a stickable-curable adhesive sheet, to be specific, to a stickable-curable adhesive sheet for bonding a deformation/conversion device.

BACKGROUND ART

An instantaneous adhesive for strain gauge for bonding a strain gauge to a test piece has been conventionally known. Such an instantaneous adhesive for strain gauge is, for example, applied to a test piece to bond the strain gauge to the test piece (ref: for example, the following Patent Document 1).

Meanwhile, a substrate-less double-sided pressure-sensitive adhesive sheet having a shear storage elastic modulus at 25° C. of $10^7$ Pa or less has been known (ref: for example, the following Patent Document 2).

CITATION LIST

Patent Document

Patent Document 1: Japanese Unexamined Patent Publication No. H2-80476
Patent Document 2: Japanese Unexamined Patent Publication No. 2015-212359

SUMMARY OF THE INVENTION

Problem to be Solved by the Invention

However, in Patent Document 1, when the instantaneous adhesive for strain gauge is applied to the test piece, there may be a case where unevenness in thickness easily occurs, and the instantaneous adhesive for strain gauge is not capable of being accurately applied in a uniform thickness. Thus, there is a disadvantage that a strain (deformation) that occurs in the test piece is not accurately transmitted to the strain gauge via the instantaneous adhesive for strain gauge, and as a result, the measurement accuracy of the strain gauge is reduced. Also, the strain gauge and the test piece are not fixed until the instantaneous adhesive for strain gauge cures. The relative position of the strain gauge and the test piece may deviate, while the instantaneous adhesive for strain gauge cures.

Meanwhile, when the strain gauge is bonded to the test piece by using the substrate-less double-sided pressure-sensitive adhesive sheet described in Patent Document 2, the elastic modulus is $10^7$ Pa or less, which is low, so that there is a disadvantage that a strain that occurs in the test piece is relaxed by the substrate-less double-sided pressure-sensitive adhesive sheet, so that the strain gauge cannot accurately detect the strain in the test piece.

An object of the present invention is to provide a stickable-curable adhesive sheet that is capable of easily bonding a deformation/conversion device to an adherend, and allowing the deformation/conversion device to accurately detect deformation of the adherend.

Means for Solving the Problem

The present invention [1] includes a stickable-curable adhesive sheet bonding a deformation/conversion device to an adherend containing a stickable-curable adhesive component and a curing component curing the stickable-curable adhesive component, wherein the stickable-curable adhesive component has pressure-sensitive adhesiveness before curing and the initial tensile elastic modulus at 25° C. of the stickable-curable adhesive sheet after curing is $5 \times 10^8$ Pa or more.

The stickable-curable adhesive sheet, as a sheet, can be prepared in a uniform thickness in advance. Thus, as in a case where the adhesive is applied to the deformation/conversion device, a nonuniform thickness can be reduced. Thus, the deformation/conversion device can be easily bonded to the adherend, while a reduction of the measurement accuracy of the deformation/conversion device caused by unevenness in thickness can be suppressed. The stickable-curable adhesive component has pressure-sensitive adhesiveness, so that the positioning can be performed by allowing the deformation/conversion device to pressure-sensitively adhere to the adherend.

In the stickable-curable adhesive sheet of the present invention, the initial tensile elastic modulus at 25° C. after curing is $5 \times 10^8$ Pa or more, which is high, so that it can be suppressed that deformation that occurs in the adherend is relaxed by the stickable-curable adhesive sheet after curing. Thus, the stickable-curable adhesive sheet can surely transmit the deformation that occurs in the adherend to the deformation/conversion device, and as a result, allow the deformation/conversion device to accurately detect the deformation of the adherend.

The present invention [2] includes the stickable-curable adhesive sheet described in the above-described [1], wherein the peeling adhesive force of a stickable-curable adhesive layer at the time of peeling the stickable-curable adhesive layer from an aluminum board at 90 degrees at a rate of 300 mm/min after the stickable-curable adhesive layer containing the stickable-curable adhesive component is bonded to the aluminum board is 0.5 N/20 mm or more.

According to the stickable-curable adhesive sheet, the peeling adhesive force of the stickable-curable adhesive layer is the above-described lower limit or more, so that the stickable-curable adhesive layer has excellent pressure-sensitive adhesive properties (initial adhesive force), so that the positioning can be performed by allowing the deformation/conversion device to pressure-sensitively adhere to the adherend.

The present invention [3] includes the stickable-curable adhesive sheet described in the above-described [1] or [2], wherein the stickable-curable adhesive component and the curing component cure at a normal temperature.

According to the stickable-curable adhesive sheet, the stickable-curable adhesive component and the curing component cure at the normal temperature, so that heating for curing the stickable-curable adhesive component and the curing component is not necessary, and the deformation/conversion device can be furthermore easily bonded to the adherend. Also, damage to the deformation/conversion device by heating can be prevented.

Effect of the Invention

According to the stickable-curable adhesive sheet of the present invention, a deformation/conversion device can be easily bonded to an adherend, and the deformation/conversion device can accurately detect deformation that occurs in the adherend.

BRIEF DESCRIPTION OF THE DRAWINGS

FIG. 1A illustrating a cross-sectional view of the stickable-curable adhesive sheet before curing and FIG. 1B illustrating a cross-sectional view of the stickable-curable adhesive sheet after curing.

FIG. 2A illustrating a step of forming a stickable-curable adhesive layer on the surface of a peeling film and FIG. 2B illustrating a step (1) of disposing the stickable-curable adhesive layer on the deformation/conversion device, a step (2) of disposing a curing agent layer on the adherend, and a step (3) of bringing the stickable-curable adhesive layer into contact with the curing agent layer so as to be sandwiched between the deformation/conversion device and the adherend.

FIG. 3A illustrating a step (1) of disposing a stickable-curable adhesive layer on the deformation/conversion device, FIG. 3B illustrating a step of disposing a curing agent layer on the stickable-curable adhesive layer, and FIG. 3C illustrating a step (3) of disposing the adherend on the curing agent layer.

FIG. 4A illustrating a step (1) of disposing the stickable-curable adhesive sheet on the deformation/conversion device and FIG. 4B illustrating a step (3) of bringing the stickable-curable adhesive sheet included in the deformation/conversion device into contact with the adherend.

FIG. 5A illustrating a plan view and

FIG. 5B illustrating a cross-sectional view.

FIG. 6A illustrating a plan view before the crack in the concrete,

FIG. 6B illustrating a cross-sectional view corresponding to FIG. 6A, and

FIG. 6C illustrating a plan view after the crack in the concrete.

FIG. 7A illustrating a perspective view before elongation of the test piece,

FIG. 7B illustrating a cross-sectional view corresponding to FIG. 7A, and

FIG. 7C illustrating a perspective view after elongation of the test piece.

DESCRIPTION OF EMBODIMENTS

Figure 1A:
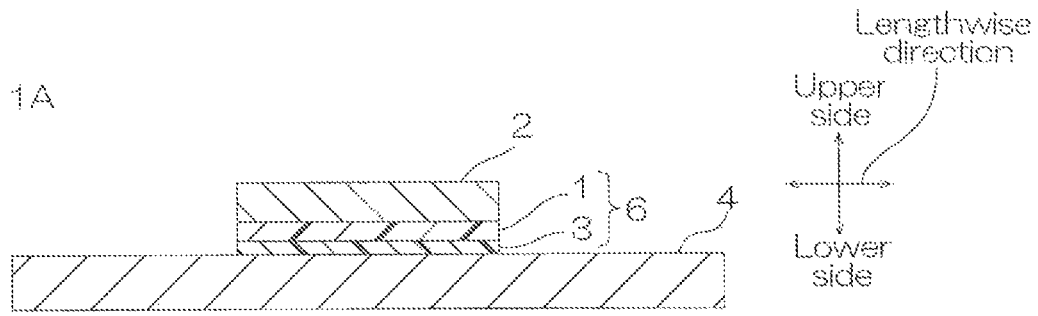
FIGS. 1A and 1B show cross-sectional views for illustrating one embodiment of bonding a deformation/conversion device to an adherend by a stickable-curable adhesive sheet that is one embodiment of the present invention.

A stickable-curable adhesive sheet 6 that is one embodiment of the present invention is described with reference to FIGS. 1A and 1B.

The stickable-curable adhesive sheet 6 is an adhesive sheet that is interposed between a deformation/conversion device 2 and an adherend 4 for bonding the deformation/conversion device 4 to the adherend 4, extends in a plane direction (direction perpendicular to a thickness direction), and has a generally flat plate shape having a flat front face and a flat rear face.

The deformation/conversion device 2 is a device that is capable of detecting deformation of the adherend 4 such as a device that is capable of converting the deformation of the adherend 4 to a change of a resistance value, a device that is capable of converting the deformation of the adherend 4 to a change of color, and a device that is capable of converting the deformation of the adherend 4 to a transfer of a moire fringe. The deformation/conversion device 2 has a generally flat plate shape extending along the plane direction. Examples thereof include a strain gauge, a crack sensor, and a strain visualizing member to be described later.

The adherend 4 is a test piece (sample) whose deformation is detected by the deformation/conversion device 2 when the deformation is imparted thereto by a material testing machine or the like. The adherend 4 is not particularly limited, and examples thereof include structure materials such as metal, glass, plastic, slate, mortar, concrete, rubber, and timber. The adherend 4 has a shape (for example, a dumbbell shape) in accordance with a test.

The stickable-curable adhesive sheet 6 contains a stickable-curable adhesive component and a curing component that cures the stickable-curable adhesive component.

To be specific, the stickable-curable adhesive sheet 6 includes a stickable-curable adhesive layer 1 containing the stickable-curable adhesive component, and a curing agent layer 3 containing the curing component.

The curing agent layer 3 and the stickable-curable adhesive layer 1 are laminated on the adherend 4 so as to be in contact with each other.

The stickable-curable adhesive layer 1 is a layer (sheet) that cures by being brought into contact with the curing agent layer 3 to react, extends along the plane direction (direction perpendicular to the thickness direction), and has a generally flat plate shape having a flat front face and a flat rear face.

The stickable-curable adhesive layer 1 is formed from the stickable-curable adhesive component into a layered shape.

The stickable-curable adhesive component is not particularly limited, as long as it is a main agent of a two-component adhesive that is capable of forming a layer. Examples thereof include silicone compounds, polyol compounds such as polypropylene glycol, urethane resins, and epoxy resins. The stickable-curable adhesive component preferably contains an epoxy resin as a main component. In this manner, the deformation/conversion device 2 can be easily and strongly bonded to the adherend 4.

Examples of the epoxy resin include bisphenol epoxy resins such as bisphenol A epoxy resin, bisphenol F epoxy resin, bisphenol S epoxy resin, and hydrogenated bisphenol A epoxy resin; naphthalene epoxy resins; biphenyl epoxy resins; dicycloepoxy resins; alicyclic epoxy resins; triglycidyl isocyanurate epoxy resins; hydantoin epoxy resins; glycidyl ether epoxy resins; and glycidyl amino epoxy resins.

As the epoxy resin, preferably, a bisphenol epoxy resin is used, more preferably, a bisphenol A epoxy resin is used.

These epoxy resins can be used alone or in combination of two or more.

The epoxy resin may be any one of the embodiments of liquid, semi-solid, and solid at a normal temperature. Preferably, a semi-solid epoxy resin is used alone, and a liquid epoxy resin and a solid epoxy resin are used in combination. In this manner, the stickable-curable adhesive layer 1 having tackiness in a layered shape can be surely formed from the stickable-curable adhesive component.

The liquid epoxy resin at the normal temperature is, to be specific, in a liquid state at 25° C. The viscosity of the liquid epoxy resin at 25° C. is, for example, 30 Pa·s or more, preferably 80 Pa·s or more, and for example, 500 Pa·s or less, preferably 300 Pa·s or less.

The solid epoxy resin at the normal temperature is, to be specific, in a solid state at 25° C. The softening point of the solid epoxy resin is, for example, 70° C. or more, preferably 75° C. or more.

The mixing ratio (liquid epoxy resin/solid epoxy resin (mass ratio)) of the liquid epoxy resin to the solid epoxy resin is, for example, 1.0 or more, preferably 1.5 or more, and for example, 4.0 or less, preferably 3.0 or less.

When the mixing ratio of the liquid epoxy resin to the solid epoxy resin is the above-described lower limit or more, the viscosity of the stickable-curable adhesive component is reduced, and occurrence of unevenness in the application can be prevented, so that the uniform stickable-curable adhesive layer 1 can be obtained. When the mixing ratio of the liquid epoxy resin to the solid epoxy resin is the above-described upper limit or less, the stickable-curable adhesive layer 1 having tackiness in a layered shape can be obtained.

The mixing ratio of the epoxy resin is set at a ratio that makes the epoxy resin a main component in the stickable-curable adhesive component. To be specific, the mixing ratio of the epoxy resin with respect to the stickable-curable adhesive component is, for example, 70 mass % or more, preferably 75 mass % or more, more preferably 80 mass % or more, further more preferably 90 mass % or more, and for example, 100 mass % or less.

Preferably, the stickable-curable adhesive component is made of only the epoxy resin, that is, the mixing ratio of the epoxy resin with respect to the stickable-curable adhesive component is 100 mass %.

An acrylic polymer can be also blended in the stickable-curable adhesive component as needed.

In this manner, the cohesive force of the stickable-curable adhesive component can be improved.

The acrylic polymer can be obtained by allowing a monomer component containing a (meth)acrylate to react.

The (meth)acrylate is an alkyl methacrylate and/or an alkyl acrylate, and to be specific, examples thereof include alkyl (meth)acrylates having 1 to 20 carbon atoms such as methyl (meth)acrylate, ethyl (meth)acrylate, propyl (meth) acrylate, isopropyl (meth)acrylate, butyl (meth)acrylate, isobutyl (meth)acrylate, s-butyl (meth)acrylate, t-butyl (meth)acrylate, n-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, octadecyl meth(acrylate), nonadecyl (meth)acrylate, and eicosyl (meth)acrylate.

As the (meth)acrylate, preferably, an alkyl (meth)acrylate having 2 to 14 carbon atoms is used, more preferably, an alkyl (meth)acrylate having 4 to 9 carbon atoms is used.

These (meth)acrylates can be used alone or in combination of two or more.

The mixing ratio of the (meth)acrylate with respect to the monomer component is, for example, 70 mass % or more, preferably 80 mass % or more, and for example, 99 mass % or less, preferably 98 mass % or less.

The monomer component can further contain a copolymerizable monomer that is copolymerizable with a (meth) acrylate.

Examples of the copolymerizable monomer include carboxyl group-containing monomers or anhydrides thereof such as (meth)acrylic acid, itaconic acid, maleic acid, crotonic acid, and maleic anhydride; hydroxyl group-containing (meth)acrylates such as 2-hydroxyethyl (meth)acrylate and 3-hydroxypropyl (meth)acrylate; amide group-containing monomers such as (meth)acrylamide, N,N-dimethyl (meth) acrylamide, N-methylol (meth)acrylamide, N-methoxymethyl (meth)acrylamide, and N-butoxymethyl (meth)acrylamide; vinyl esters such as vinyl acetate; aromatic vinyl compounds such as styrene and vinyl toluene; (meth)acrylonitrile; N-(meth)acryloyl morpholine; and N-vinyl-2-pyrrolidone.

As the copolymerizable monomer, preferably, a carboxyl group-containing monomer and a hydroxyl group-containing (meth)acrylate are used, more preferably, a (meth)acrylic acid and a 2-hydroxyethyl (meth)acrylate are used.

These copolymerizable monomers can be used alone or in combination of two or more. Preferably, a carboxyl group-containing monomer and a hydroxyl group-containing (meth)acrylate are used in combination, more preferably, a (meth)acrylic acid and a 2-hydroxyethyl (meth)acrylate are used in combination.

The mixing ratio of the copolymerizable monomer with respect to 100 parts by mass of the (meth)acrylate is, for example, 0.1 parts by mass or more, preferably 0.3 parts by mass or more, and for example, 15 parts by mass or less, preferably 10 parts by mass or less.

To react the monomer component, for example, the (meth)acrylate and, if necessary, the copolymerizable monomer are blended to prepare the monomer component. The obtained monomer component is, for example, prepared by a known polymerization method such as solution polymerization, bulk polymerization, emulsion polymerization, and various radical polymerizations.

As the polymerization method, preferably, solution polymerization is used.

In the solution polymerization, for example, the monomer component and a polymerization initiator are blended in a solvent to prepare a monomer solution. Thereafter, the monomer solution is heated.

Examples of the solvent include organic solvents. Examples of the organic solvent include aromatic solvents such as toluene, benzene, and xylene; ether solvents; ketone solvents such as acetone and methyl ethyl ketone; ester solvents such as ethyl acetate; and amide solvents such as N,N-dimethylformamide. These solvents can be used alone or in combination of two or more. Preferably, an aromatic solvent and an ether solvent are used in combination. The mixing ratio of the solvent with respect to 100 parts by mass of the monomer component is, for example, 10 parts by mass or more, preferably 50 parts by mass or more, and for example, 1000 parts by mass or less, preferably 500 parts by mass or less.

Examples of the polymerization initiator include peroxide polymerization initiators and azo-based polymerization initiators.

Examples of the peroxide polymerization initiator include organic peroxides such as peroxycarbonate, ketone peroxide, peroxy ketal, hydroperoxide, dialkyl peroxide, diacyl peroxide, and peroxy ester.

Examples of the azo-based polymerization initiator include azo-based compounds such as 2,2'-azobisisobutylonitrile, 2,2'-azobis(2-methylbutylonitrile), 2,2'-azobis(2,4-dimethylvaleronitrile), and 2,2'-azobis dimethyl isobutyrate.

As the polymerization initiator, preferably, an azo-based polymerization initiator is used.

The mixing ratio of the polymerization initiator with respect to 100 parts by mass of the monomer component is, for example, 0.01 parts by mass or more, preferably 0.05 parts by mass or more, and for example, 5 parts by mass or less, preferably 3 parts by mass or less.

The heating temperature is, for example, 50° C. or more and 80° C. or less, and the heating time is, for example, 1 hour or more and 24 hours or less.

In this manner, the monomer component is polymerized, so that an acrylic polymer solution containing an acrylic polymer is obtained.

The acrylic polymer solution is blended in the epoxy resin so that the mixing ratio of the acrylic polymer with respect to 100 parts by mass of the stickable-curable adhesive component is, for example, 1 part by mass or more, preferably 2 parts by mass or more, and for example, 50 parts by mass or less, preferably 30 parts by mass or less. The mixing ratio of the acrylic polymer with respect to 100 parts by mass of the epoxy resin is, for example, 1 part by mass or more, preferably 2 parts by mass or more, and for example, 43 parts by mass or less, preferably 35 parts by mass or less.

When the mixing ratio of the acrylic polymer is the above-described lower limit or more, the cohesive force and consequently, the pressure-sensitive adhesive force of the stickable-curable adhesive component are improved, so that the peeling adhesive force of the stickable-curable adhesive layer 1 can be improved.

When the mixing ratio of the acrylic polymer is the above-described upper limit or less, the stickable-curable adhesive component can cure.

A slight amount of a curing agent can be also blended in the stickable-curable adhesive component.

In this manner, the cohesive force of the stickable-curable adhesive layer 1 can be improved.

Illustrations of the curing agent are described later.

The mixing ratio of the curing agent is adjusted at a ratio that improves the peeling adhesive force of the stickable-curable adhesive layer 1, and slightly cures (does not completely cure) the stickable-curable adhesive component.

To obtain the stickable-curable adhesive component, for example, the epoxy resin and, if necessary, the acrylic polymer (acrylic polymer solution) and/or the curing agent are blended and, if necessary, diluted in a solvent, thereby preparing a varnish.

As the solvent, one that is capable of dissolving the stickable-curable adhesive component is used, and an example thereof includes the above-described solvent. As the solvent, preferably, a ketone solvent is used.

The concentration of the stickable-curable adhesive component in the varnish is, for example, 20 mass % or more, preferably 40 mass % or more, and for example, 80 mass % or less, preferably 70 mass % or less.

When the acrylic polymer is blended in the stickable-curable adhesive component, a cross-linking agent can be also blended at the time of preparation of the stickable-curable adhesive component.

Examples of the cross-linking agent include isocyanate cross-linking agents, aziridine cross-linking agents, epoxy cross-linking agents, and metal chelate cross-linking agents. Preferably, an isocyanate cross-linking agent is used.

Examples of the isocyanate cross-linking agent include aromatic diisocyanates such as tolylene diisocyanate and xylylene diisocyanate; alicyclic diisocyanates such as isophorone diisocyanate; aliphatic diisocyanates such as hexamethylene diisocyanate; and modified products of isocyanates (to be specific, tolylene diisocyanate adduct of trimethylolpropane or the like)

As the cross-linking agent, preferably, a modified product of an isocyanate is used.

The mixing ratio of the cross-linking agent with respect to 100 parts by mass of the acrylic polymer is, for example, 1 part by mass or more, preferably 5 parts by mass or more, and for example, 20 parts by mass or less, preferably 15 parts by mass or less.

In this manner, the stickable-curable adhesive component is prepared.

As described later, the stickable-curable adhesive layer 1 is formed in a predetermined thickness by applying the stickable-curable adhesive component on a substrate to be dried.

The thickness of the stickable-curable adhesive layer 1 is, for example, 1 μm or more, preferably 5 μm or more, more preferably 10 μm or more, and for example, 1000 μm or less, preferably 500 μm or less, more preferably 100 μm or less.

The curing agent layer 3 is a layer (sheet) that is capable of curing the stickable-curable adhesive layer 1 by being brought into contact therewith to react, extends along the plane direction (direction perpendicular to the thickness direction), and has a generally flat plate shape having a flat front face and a flat rear face.

The curing agent layer 3 is formed from a curing component into a layered shape.

The curing component contains a curing agent.

The curing agent is not particularly limited, as long as it is a curing agent of a two-component adhesive that is capable of forming a layer. When the stickable-curable adhesive component contains the epoxy resin, examples thereof include epoxy resin curing agents such as imidazole compound, amine compound, and amide compound.

Examples of the imidazole compound include methyl imidazole, 2-ethyl-4-methyl imidazole, 1-isobutyl-2-methyl imidazole, 1-benzyl-2-methyl imidazole, 2-ethyl-4-methyl imidazole, ethyl imidazole, isopropyl imidazole, 2,4-dimethyl imidazole, phenyl imidazole, undecyl imidazole, heptadecyl imidazole, 2-phenyl-4-methyl imidazole, 2-phenyl-4,5-dihydroxymethyl imidazole, and 2-phenyl-4-methyl-5-hydroxymethyl imidazole. Preferably, 1-isobutyl-2-methyl imidazole, 1-benzyl-2-methyl imidazole, and 2-ethyl-4- methyl imidazole are used, more preferably, 1-isobutyl-2-methyl imidazole and 1-benzyl-2-methyl imidazole are used, further more preferably, 1-isobutyl-2-methyl imidazole is used.

Examples of the amine compound include ethylene diamine, propylene diamine, diethylene triamine, and triethylene tetramine and amine adducts thereof, methaphenylene diamine, diaminodiphenyl methane, and diaminodiphenyl sulfone.

Examples of the amide compound include dicyandiamide and polyamide. Preferably, dicyandiamide is used.

As the curing agent, preferably, an imidazole compound is used.

These curing agents can be used alone or in combination of two or more.

The mixing ratio of the curing agent with respect to the curing component is, for example, 10 mass % or more, preferably 30 mass % or more, more preferably 50 mass % or more, further more preferably 80 mass % or more, particularly preferably 90 mass % or more, and for example, 100 mass % or less. When the mixing ratio of the curing agent is the above-described lower limit or more, the stickable-curable adhesive layer 1 has excellent adhesive properties.

Preferably, the curing component is made of only the curing agent, that is, the mixing ratio of the curing agent with respect to the curing component is 100 mass %.

A curing accelerator can be also blended in the curing component as needed.

Examples of the curing accelerator include urea compounds such as 3-(3,4-dichlorophenyl)-1,1-dimethylurea (DCMU), N'-phenyl-N,N-dimethyl urea, and 1,1'-(methyl-m-phenylene)bis(3,3'-dimethyl urea); tertiary amine compounds such as triethylenediamine and tri-2,4,6-dimethyl-aminomethylphenol; phosphorus compounds such as triphenylphosphine, tetraphenylphosphoniumtetraphenylborate, and tetra-n-butylphosphonium-o,o-diethylphosphorodithioate; quaternary ammonium salt compounds; and organometallic salt compounds. Preferably, a urea compound is used, more preferably, 3-(3,4-dichlorophenyl)-1,1-dimethylurea is used.

These curing accelerators can be used alone or in combination of two or more.

The mixing ratio of the curing accelerator with respect to the curing component is, for example, 10 mass % or more, preferably 15 mass % or more, more preferably 25 mass % or more, and for example, 40 mass % or less. The mixing ratio of the curing accelerator with respect to 100 parts by mass of the curing agent is, for example, 10 parts by mass or more, preferably 25 parts by mass or more, and for example, 60 parts by mass or less, preferably 50 parts by mass or less.

To prepare the curing component, the curing agent and, if necessary, the curing accelerator are blended.

When the curing agent is solid, the curing agent is dissolved with the solvent as needed, so that a varnish is prepared.

As the solvent, one that is capable of dissolving the curing component is used, and an example thereof includes the above-described solvent.

The concentration of the curing component in the varnish is, for example, 10 mass % or more, preferably 20 mass % or more, and for example, 90 mass % or less, preferably 50 mass % or less.

In this manner, the curing component is prepared.

As described later, the curing agent layer 3 is formed in a predetermined thickness by applying the curing component on the stickable-curable adhesive layer 1 or a substrate to be dried.

The thickness of the curing agent layer 3 is, for example, 1 μm or more, preferably 5 μm or more, more preferably 10 μm or more, and for example, 1000 μm or less, preferably 800 μm or less, more preferably 500 μm or less.

The stickable-curable adhesive sheet 6 is interposed between the adherend 4 and the deformation/conversion device 2 so that the stickable-curable adhesive layer 1 is in contact with the deformation/conversion device 2, and the curing agent layer 3 is in contact with the adherend 4.

In the stickable-curable adhesive sheet 6, the stickable-curable adhesive component has pressure-sensitive adhesiveness before curing.

The pressure-sensitive adhesiveness before curing means that before the stickable-curable adhesive component reacts with the curing component to completely cure, it has the pressure-sensitive adhesiveness. To be specific, the pressure-sensitive adhesiveness before curing is before blending of the stickable-curable adhesive component with the curing component until complete curing of the stickable-curable adhesive component after blending.

That is, the stickable-curable adhesive layer 1 containing the stickable-curable adhesive component has the pressure-sensitive adhesiveness.

To be specific, the peeling adhesive force of the stickable-curable adhesive layer 1 with respect to an aluminum board is, for example, 0.5 N/20 mm or more, preferably, 1.0 N/20 mm or more, more preferably, 2.0 N/20 mm or more, further more preferably, 3.0 N/20 mm or more, particularly preferably, 3.5 N/20 mm or more, and for example, 10 N/20 mm or less.

When the peeling adhesive force of the stickable-curable adhesive layer 1 with respect to the aluminum board is the above-described lower limit or more, the stickable-curable adhesive layer 1 has excellent pressure-sensitive adhesiveness, so that the positioning can be performed by allowing the deformation/conversion device 2 to pressure-sensitively adhere to the adherend 4. The peeling adhesive force of the stickable-curable adhesive layer 1 is obtained as the peeling adhesive force of the stickable-curable adhesive layer 1 at the time of peeling the stickable-curable adhesive layer 1 from the aluminum board at 90 degrees at a rate of 300 mm/min after the stickable-curable adhesive layer 1 is bonded to the aluminum board.

In this way, the stickable-curable adhesive layer 1 has the pressure-sensitive adhesiveness, so that at the initial time (before curing) when the stickable-curable adhesive sheet 6 is interposed between the adherend 4 and the deformation/conversion device 2, the adherend 4 pressure-sensitively adheres to the deformation/conversion device 2 by the stickable-curable adhesive layer 1. Thus, the positioning of the deformation/conversion device 2 with respect to the adherend 4 is surely performed.

Figure 1B:
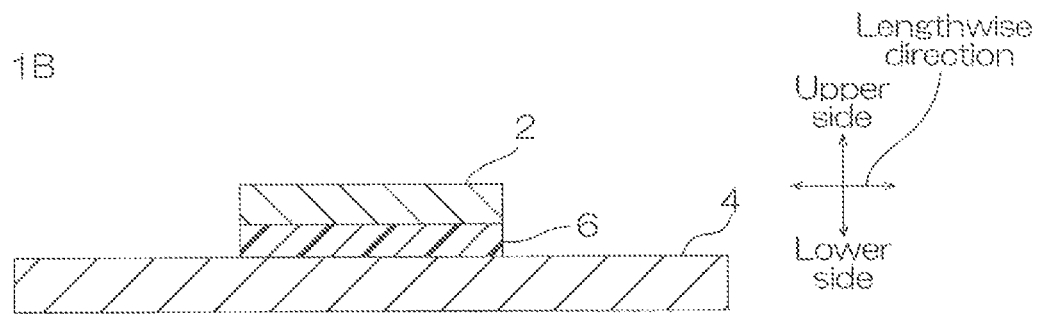

Thereafter, as shown in FIG. 1B, in the stickable-curable adhesive sheet 6, the stickable-curable adhesive layer 1 reacts with the curing agent layer 3, so that the stickable-curable adhesive sheet 6 cures.

The reaction temperature is, for example, the normal temperature.

Also, the stickable-curable adhesive layer 1 and the curing agent layer 3 may be heated as needed. The heating temperature is, for example, 50° C. or more, preferably 70° C. or more, and for example, 160° C. or less, preferably 110° C. or less.

The reaction temperature is preferably the normal temperature. The normal temperature is a temperature at which the above-described heating (for example, heating of 50° C. or more) for allowing the stickable-curable adhesive layer 1 to react with the curing agent layer 3 is not performed. The normal temperature is, for example, below 50° C., preferably 40° C. or less, and for example, 10° C. or more, preferably 20° C. or more.

When the reaction temperature is the normal temperature, heating for allowing the stickable-curable adhesive layer 1 to react with the curing agent layer 3 is not necessary, and the deformation/conversion device 2 can be furthermore easily bonded to the adherend 4. Also, damage to the deformation/conversion device 2 by heating can be prevented.

The reaction time is, for example, 15 minutes or more, preferably 1 hour or more, more preferably 12 hours or more, and for example, 96 hours or less, preferably 48 hours or less.

In this manner, the stickable-curable adhesive sheet 6 cures. Preferably, the stickable-curable adhesive sheet 6 cures at the normal temperature.

The thickness of the stickable-curable adhesive sheet 6 after curing is, for example, 1 μm or more, preferably 5 μm or more, more preferably 30 μm or more, and for example, 2000 μm or less, preferably 1000 μm or less, more preferably 500 μm or less, further more preferably 100 μm or less.

The deformation/conversion device 2 is bonded to the adherend 4 by the stickable-curable adhesive sheet 6 after curing.

The initial tensile elastic modulus at 25° C. of the stickable-curable adhesive sheet 6 after curing is $5.0 \times 10^8$ Pa or more, preferably, $1.0 \times 10^9$ Pa or more, more preferably, $1.2 \times 10^9$ Pa or more.

To be more specific, when the thickness of the stickable-curable adhesive sheet 6 after curing is thick, a higher initial tensile elastic modulus at 25° C. is necessary. When the thickness of the stickable-curable adhesive sheet 6 after curing is, for example, 500 μm or more, the initial tensile elastic modulus at 25° C. of the stickable-curable adhesive sheet 6 after curing satisfies the relationship of the following formula (1).

$$\text{Initial tensile elastic modulus}/6 \times 10^5 \times (\text{thickness (μm)} \text{ of the stickable-curable adhesive sheet 6 after curing}) \geq 2 \times 10^8 \quad (1)$$

When the initial tensile elastic modulus of the stickable-curable adhesive sheet 6 after curing satisfies the relationship of the above-described formula (1), it can be suppressed that the deformation that occurs in the adherend 4 is relaxed by the stickable-curable adhesive sheet 6 after curing.

When the thickness of the stickable-curable adhesive sheet 6 after curing is 300 μm or more and below 500 μm, the initial tensile elastic modulus at 25° C. of the stickable-curable adhesive sheet 6 after curing is preferably, $1.2 \times 10^9$ Pa or more, more preferably, $1.3 \times 10^9$ Pa or more.

When the thickness of the stickable-curable adhesive sheet 6 after curing is 200 μm or more and below 300 μm, the initial tensile elastic modulus at 25° C. of the stickable-curable adhesive sheet 6 after curing is preferably, $1.0 \times 10^9$ Pa or more, more preferably, $1.2 \times 10^9$ Pa or more.

When the thickness of the stickable-curable adhesive sheet 6 after curing is 90 μm or more and below 200 μm, the initial tensile elastic modulus at 25° C. of the stickable-curable adhesive sheet 6 after curing is preferably, $5.7 \times 10^8$ Pa or more, more preferably, $1.0 \times 10^9$ Pa or more.

When the initial tensile elastic modulus of the stickable-curable adhesive sheet 6 after curing is the above-described lower limit or more, it can be suppressed that the deformation that occurs in the adherend 4 is relaxed by the stickable-curable adhesive sheet 6 after curing.

The details of the measurement method of the initial tensile elastic modulus of the stickable-curable adhesive sheet 6 after curing are described in Examples to be described later. The initial tensile elastic modulus (Pa) is obtained by an inclination of the initial part (tangent) of a deformation-strain curve.

Subsequently, an embodiment of a method for bonding the deformation/conversion device 2 to the adherend 4 by the stickable-curable adhesive sheet 6 is described with reference to FIGS. 2 to 4.

Figure 2A:
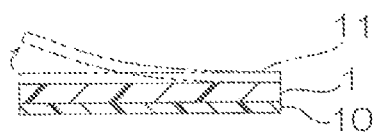
FIGS. 2A and 2B show process drawings for illustrating one embodiment of a method for bonding a deformation/conversion device to an adherend by a stickable-curable adhesive sheet.
Figure 2B:
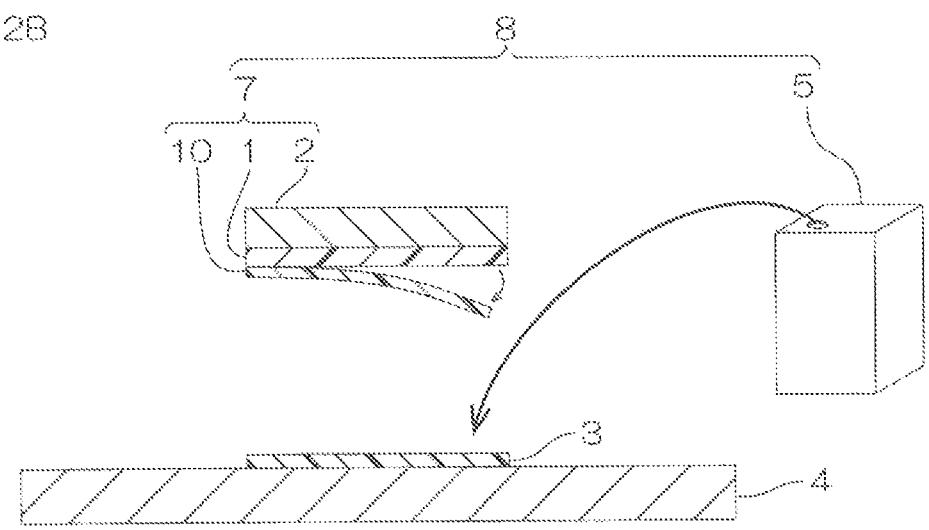
Figure 3A:
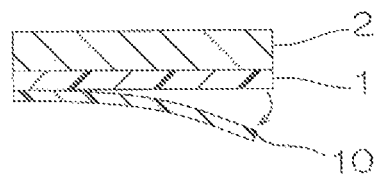
FIGS. 3A to 3C show process drawings for illustrating another embodiment of a method for bonding a deformation/conversion device to an adherend by a stickable-curable adhesive sheet.
Figure 3B:
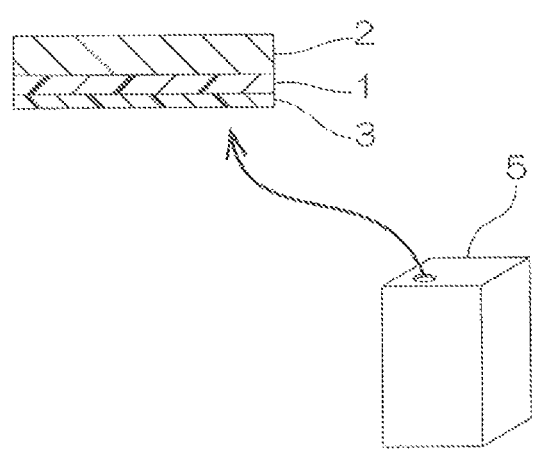
Figure 4A:
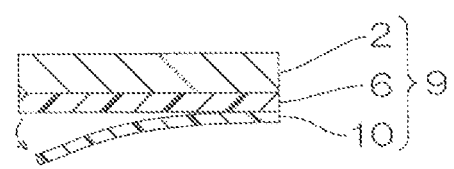
FIGS. 4A and 4B show process drawings for illustrating another embodiment of a method for bonding a deformation/conversion device to an adherend by a stickable-curable adhesive sheet of the present invention.
Figure 4B:

To be specific, as the method for bonding the deformation/conversion device 2 to the adherend 4, each of the following methods is described. Examples of the method include a method in which the stickable-curable adhesive layer 1 is disposed on the deformation/conversion device 2 and separately, the curing agent layer 3 is disposed on the adherend 4 to bring the stickable-curable adhesive layer 1 into contact with the curing agent layer 3, so that the deformation/conversion device 2 is bonded to the adherend 4 (ref: FIGS. 2A and 2B); a method in which the stickable-curable adhesive layer 1 and the curing agent layer 3 are sequentially disposed on the surface of the deformation/conversion device 2 to bring the curing agent layer 3 into contact with the adherend 4, so that the deformation/conversion device 2 is bonded to the adherend 4 (ref: FIGS. 3A and 3B); and a method in which the stickable-curable adhesive sheet 6 containing the stickable-curable adhesive component and the curing component is disposed on the deformation/conversion device 2 to bring the stickable-curable adhesive sheet 6 into contact with the adherend 4, so that the deformation/conversion device 2 is bonded to the adherend 4 (ref: FIGS. 4A and 4B).

First, the method in which the stickable-curable adhesive layer 1 is disposed on the deformation/conversion device 2 and separately, the curing agent layer 3 is disposed on the adherend 4 to bring the stickable-curable adhesive layer 1 into contact with the curing agent layer 3, so that the deformation/conversion device 2 is bonded to the adherend 4 is described with reference to FIGS. 2A and 2B.

This method includes a step (1) of disposing the stickable-curable adhesive layer 1 on the deformation/conversion device 2 (ref: FIG. 2B), a step (2) of disposing the curing agent layer 3 on the adherend 4 (ref: FIG. 2B), and a step (3) of bringing the stickable-curable adhesive layer 1 into contact with the curing agent layer 3 so as to be sandwiched between the deformation/conversion device 2 and the adherend 4 (ref: FIG. 2B).

In this method, first, as shown in FIG. 2B, the stickable-curable adhesive layer 1 is disposed on the deformation/conversion device 2 (step (1)).

To dispose the stickable-curable adhesive layer 1 on the deformation/conversion device 2, as shown in FIG. 2A, for example, first, the stickable-curable adhesive layer 1 is formed on the surface of a peeling film 10.

To form the stickable-curable adhesive layer 1 on the surface of the peeling film 10, first, the stickable-curable adhesive component is prepared by the above-described method.

Thereafter, the stickable-curable adhesive component is applied to the surface of the peeling film 10 to be then dried.

As shown in FIG. 2A, the peeling film 10 is, for example, a peeling sheet in a generally rectangular flat plate shape, and the upper face and the lower face thereof are formed flat.

The peeling film 10 is, for example, formed from a resin material into a film. Examples of the resin material include vinyl polymers such as polyolefin (to be specific, polyethylene, polypropylene) and ethylene•vinyl acetate copolymer (EVA); polyesters such as polyethylene terephthalate and polycarbonate; and fluorine resins such as polytetrafluoroethylene. The peeling film 10 can be, for example, also formed from metal materials such as iron, aluminum, and stainless steel.

As the peeling film 10, preferably, a polyester film is used, more preferably, a polyethylene terephthalate film is used.

The surface of the peeling film 10 may be subjected to appropriate peeling treatment as needed.

The thickness of the peeling film 10 is, for example, 10 μm or more and 1000 μm or less.

Examples of the application method include doctor blade method, rolling method, screen method, and gravure method.

To dry the stickable-curable adhesive component, the stickable-curable adhesive component is, for example, heated.

The heating temperature is, for example, 70° C. or more and 130° C. or less, and the heating time is, for example, 1 minute or more and 5 minutes or less.

When the stickable-curable adhesive component contains the cross-linking agent, after the above-described heating, further heating is performed, so that the acrylic polymer is cross-linked by the cross-linking agent. The temperature in the further heating is, for example, 30° C. or more and 60° C. or less, and the time is, for example, 1 hour or more, preferably 1 day or more.

When the stickable-curable adhesive component contains the curing agent, the heating temperature is 70° C. or more and 160° C. or less, and the heating time is 5 minutes or more and 5 hours or less. In this manner, the entire curing agent reacts with a part of the epoxy resin.

In this manner, the stickable-curable adhesive layer 1 is formed from the stickable-curable adhesive component on the surface of the peeling film 10.

Also, if necessary, another peeling film 11 can be disposed on (brought into contact with) the surface (surface that is the opposite side to the contact surface in contact with the peeling film 10) of the stickable-curable adhesive layer 1.

That is, the stickable-curable adhesive layer 1 can be also sandwiched between the two pieces of the peeling film 10 and the peeling film 11.

Thereafter, as shown in FIG. 2B, the stickable-curable adhesive layer 1 is transferred from the peeling film 10 to the surface of the deformation/conversion device 2. To be specific, first, the stickable-curable adhesive layer 1 is brought into contact with the deformation/conversion device 2, and subsequently, as shown by an arrow of FIG. 2B, the peeling film 10 is peeled from the stickable-curable adhesive layer 1.

After the step (2) and immediately before the step (3), the peeling film 10 can be also peeled from the stickable-curable adhesive layer 1.

When the stickable-curable adhesive layer 1 is sandwiched between the two pieces of the peeling film 10 and the peeling film 11, for example, as shown by the arrow in phantom lines of FIG. 2A, first, the peeling film 11 is peeled. Next, as shown in FIG. 2B, the exposed surface of the exposed stickable-curable adhesive layer 1 is brought into contact with the deformation/conversion device 2, and subsequently, as shown by the arrow of FIG. 2B, the peeling film 10 is peeled from the stickable-curable adhesive layer 1.

In this manner, as shown in FIG. 2B, the stickable-curable adhesive layer 1 is disposed on the deformation/conversion device 2.

In this method, as shown in FIG. 2B, the curing agent layer 3 is separately disposed on the adherend 4 (step (2)).

To dispose the curing agent layer 3 on the adherend 4, a curing component 5 is prepared by the above-described method.

Thereafter, the curing component 5 is applied to the adherend 4. To be specific, a varnish of the curing component 5 is applied to a portion that is to be bonded to the deformation/conversion device 2 in the adherend 4.

An example of the application method includes the above-described method.

Thereafter, an unnecessary varnish of the curing component 5 on the surface of the adherend 4 is removed as needed. For example, the unnecessary varnish of the curing component 5 on the surface of the adherend 4 is wiped off.

Subsequently, when the varnish contains the solvent, the varnish is dried, and the solvent is removed.

In this manner, the curing agent layer 3 is formed on the surface of the adherend 4, and the curing agent layer 3 is disposed on the adherend 4.

Next, in this method, as shown in FIG. 2B, the stickable-curable adhesive layer 1 is brought into contact with the curing agent layer 3 so as to be sandwiched between the deformation/conversion device 2 and the adherend 4 (step (3)).

That is, the deformation/conversion device 2 is overlapped with the adherend 4 so that the stickable-curable adhesive layer 1 is brought into contact with the curing agent layer 3.

Next, the stickable-curable adhesive sheet 6 cures under the above-described conditions.

The deformation/conversion device 2 is bonded to the adherend 4 by the stickable-curable adhesive sheet 6 after curing.

A stickable-curable adhesive layer-including deformation/conversion device kit 8 that includes a stickable-curable adhesive layer-including deformation/conversion device 7 including the deformation/conversion device 2, the stickable-curable adhesive layer 1 that pressure-sensitively adheres to the deformation/conversion device 2, and the peeling film 10, and the curing component 5 that cures the stickable-curable adhesive layer 1 can be also prepared in advance.

The stickable-curable adhesive layer-including deformation/conversion device kit 8 is preferably prepared from only the stickable-curable adhesive layer-including deformation/conversion device 7 that consists of only the deformation/conversion device 2 and the stickable-curable adhesive layer 1 pressure-sensitively adhering to the deformation/conversion device 2, and the curing component 5 that cures the stickable-curable adhesive layer 1.

In the stickable-curable adhesive layer-including deformation/conversion device kit 8, the deformation/conversion device 2 includes the stickable-curable adhesive layer 1 in advance, so that the deformation/conversion device 2 can be easily bonded to the adherend 4 only by applying the curing component 5 to the adherend 4 to bring the stickable-curable adhesive layer 1 into contact with the curing component 5.

According to the stickable-curable adhesive layer-including deformation/conversion device kit 8, the initial tensile elastic modulus at 25° C. of the stickable-curable adhesive layer 1 after curing is $5 \times 10^8$ Pa or more, which is high, so that it can be suppressed that the deformation that occurs in the adherend 4 is relaxed by the stickable-curable adhesive sheet 6 after curing. Thus, the stickable-curable adhesive sheet 6 can surely transmit the deformation that occurs in the adherend 4 to the deformation/conversion device 2, and as a result, allow the deformation/conversion device 2 to accurately detect the deformation of the adherend 4.

Next, the method in which the stickable-curable adhesive layer 1 and the curing agent layer 3 are sequentially disposed on the surface of the deformation/conversion device 2 to bring the curing agent layer 3 into contact with the adherend 4, so that the deformation/conversion device 2 is bonded to the adherend 4 is described with reference to FIGS. 3A to 3C.

This method includes a step (1) of disposing the stickable-curable adhesive layer 1 on the deformation/conversion device 2 (ref: FIG. 3A), a step (2) of disposing the curing agent layer 3 on the stickable-curable adhesive layer 1 (ref: FIG. 3B), and a step (3) of disposing the adherend 4 on the curing agent layer 3 (ref: FIG. 3C).

In this method, as shown in FIGS. 3A and 3B, the stickable-curable adhesive layer 1 and the curing agent layer 3 are sequentially disposed on the surface of the deformation/conversion device 2.

In this method, first, as shown in FIG. 3A, the stickable-curable adhesive layer 1 is disposed on the surface of the deformation/conversion device 2 by the above-described method.

Subsequently, as shown in FIG. 3B, the curing agent layer 3 is disposed on the surface of the stickable-curable adhesive layer 1.

To dispose the curing agent layer 3 on the surface of the stickable-curable adhesive layer 1, for example, the varnish of the curing component 5 is applied to the surface of the stickable-curable adhesive layer 1 and, if necessary, dried. Or, the varnish of the curing component 5 is applied to the surface of a peeling film (not shown) and, if necessary, dried. In this manner, the curing agent layer 3 is formed on the surface of the peeling film. Thereafter, the curing agent layer 3 is transferred from the peeling film to the surface of the stickable-curable adhesive layer 1.

Figure 3C:
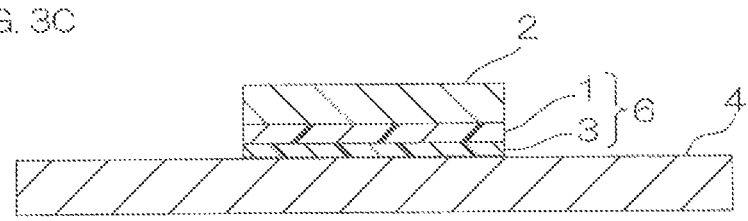

Subsequently, as shown in FIG. 3C, the adherend 4 is disposed on the surface of the curing agent layer 3. That is, the deformation/conversion device 2 including the stickable-curable adhesive layer 1 and the curing agent layer 3 is disposed on the adherend 4. In this manner, the stickable-curable adhesive layer 1 and the curing agent layer 3 are sandwiched between the deformation/conversion device 2 and the adherend 4.

In this manner, the positioning can be performed by allowing the deformation/conversion device 2 to pressure-sensitively adhere to the adherend 4 by the stickable-curable adhesive sheet 6.

Next, the stickable-curable adhesive sheet 6 cures under the above-described conditions.

The deformation/conversion device 2 is bonded to the adherend 4 by the stickable-curable adhesive sheet 6 after curing.

Lastly, the method in which the stickable-curable adhesive sheet 6 containing the stickable-curable adhesive component and the curing component is disposed on the deformation/conversion device 2 to bring the stickable-curable adhesive sheet 6 into contact with the adherend 4, so that the deformation/conversion device 2 is bonded to the adherend 4 is described with reference to FIGS. 4A and 4B.

This method includes a step (1) of disposing the stickable-curable adhesive sheet 6 on the deformation/conversion device 2 (ref: FIG. 4A) and a step (3) of bringing the stickable-curable adhesive sheet 6 included in the deformation/conversion device 2 into contact with the adherend 4 (ref: FIG. 4B).

In this method, the stickable-curable adhesive sheet 6 containing both of the stickable-curable adhesive component and the curing component is prepared without separately preparing the stickable-curable adhesive layer 1 and the curing agent layer 3.

To prepare the stickable-curable adhesive sheet 6 containing both of the stickable-curable adhesive component and the curing component, first, a stickable-curable adhesive composition containing the stickable-curable adhesive component and the curing component is prepared.

An example of the stickable-curable adhesive component includes the above-described component.

The mixing ratio of the stickable-curable adhesive component with respect to 100 parts by mass of the stickable-curable adhesive composition is, for example, 70 parts by mass or more, preferably 80 parts by mass or more, more preferably 90 parts by mass or more, and for example, 99 parts by mass or less.

An example of the curing component includes the above-described component.

The mixing ratio of the curing agent with respect to 100 parts by mass of the stickable-curable adhesive composition is, for example, 2 parts by mass or more, preferably 5 parts by mass or more, more preferably 15 parts by mass or more, further more preferably 20 parts by mass or more, and for example, 50 parts by mass or less, preferably 35 parts by mass or less.

The mixing ratio of the curing agent with respect to 100 parts by mass of the epoxy resin is, for example, 0.05 parts by mass or more, preferably 0.15 parts by mass or more, and for example, 40 parts by mass or less, preferably 35 parts by mass or less. When the curing agent is an amide compound, to be specific, the mixing ratio thereof with respect to 100 parts by mass of the epoxy resin is, for example, 0.05 parts by mass or more, preferably, 0.15 parts by mass or more, and for example, 5 parts by mass or less, preferably 4 parts by mass or less. When the curing agent is an amine compound, to be specific, the mixing ratio thereof with respect to 100 parts by mass of the epoxy resin is, for example, 40 parts by mass or less, preferably 35 parts by mass or less, more preferably 30 parts by mass or less.

A curing accelerator may be also blended in the stickable-curable adhesive composition as needed.

The mixing ratio of the curing accelerator with respect to 100 parts by mass of the stickable-curable adhesive composition is, for example, 0.1 parts by mass or more, preferably 1 part by mass or more, and for example, 5 parts by mass or less, preferably 3 parts by mass or less.

The mixing ratio of the curing accelerator with respect to 100 parts by mass of the curing agent is, for example, 10 parts by mass or more, preferably 20 parts by mass or more, and for example, 60 parts by mass or less, preferably 50 parts by mass or less.

To obtain the stickable-curable adhesive composition, for example, the stickable-curable adhesive component and the curing component, and, if necessary, the curing accelerator are blended, and, if necessary, diluted with the solvent, thereby preparing a varnish.

As the solvent, one that is capable of dissolving the stickable-curable adhesive composition is used, and an example thereof includes the above-described solvent.

The concentration of the stickable-curable adhesive composition in the varnish is, for example, 20 mass % or more, preferably 40 mass % or more, and for example, 80 mass % or less, preferably 70 mass % or less.

In this manner, the stickable-curable adhesive composition is prepared.

Then, the stickable-curable adhesive composition is applied to the surface of the peeling film 10, and, if necessary, dried.

In this manner, the stickable-curable adhesive sheet 6 is formed on the surface of the peeling film 10.

Next, as shown in FIG. 4A, the stickable-curable adhesive sheet 6 is disposed on the deformation/conversion device 2.

To dispose the stickable-curable adhesive sheet 6 on the deformation/conversion device 2, the stickable-curable adhesive sheet 6 is transferred from the peeling film 10 to the surface of the deformation/conversion device 2.

In this manner, the stickable-curable adhesive sheet 6 is disposed on the deformation/conversion device 2.

Next, as shown in FIG. 4B, the stickable-curable adhesive sheet 6 included in the deformation/conversion device 2 is brought into contact with the adherend 4.

In this manner, the positioning can be performed by allowing the deformation/conversion device 2 to pressure-sensitively adhere to the adherend 4 by the stickable-curable adhesive sheet 6.

Next, the stickable-curable adhesive sheet 6 cures under the above-described conditions.

The deformation/conversion device 2 is bonded to the adherend 4 by the stickable-curable adhesive sheet 6 after curing.

A stickable-curable adhesive sheet-including deformation/conversion device 9 that includes the deformation/conversion device 2, the stickable-curable adhesive sheet 6 that pressure-sensitively adheres to the deformation/conversion device 2, and the peeling film 10 can be also prepared in advance.

The stickable-curable adhesive sheet-including deformation/conversion device 9 is preferably prepared from only the deformation/conversion device 2 and the stickable-curable adhesive sheet 6 that pressure-sensitively adheres to the deformation/conversion device 2.

According to the stickable-curable adhesive sheet-including deformation/conversion device 9, the deformation/conversion device 2 includes the stickable-curable adhesive sheet 6 in advance, and additionally, the stickable-curable adhesive sheet 6 contains the stickable-curable adhesive component and the curing component, so that the deformation/conversion device 2 can be easily bonded to the adherend 4 only by bringing the stickable-curable adhesive sheet 6 included in the deformation/conversion device 2 into contact with the adherend 4.

According to the stickable-curable adhesive sheet-including deformation/conversion device 9, the initial tensile elastic modulus at 25° C. of the stickable-curable adhesive sheet 6 after curing is $5 \times 10^8$ Pa or more, which is high, so that it can be suppressed that the deformation that occurs in the adherend 4 is relaxed by the stickable-curable adhesive sheet 6 after curing. Thus, the stickable-curable adhesive sheet 6 can surely transmit the deformation that occurs in the adherend 4 to the deformation/conversion device 2, and as a result, allow the deformation/conversion device 2 to accurately detect the deformation of the adherend 4.

Subsequently, each of the specific examples of using the stickable-curable adhesive sheet 6 in bonding the deformation/conversion device 2 to the adherend 4 is described with reference to FIGS. 5 to 7.

First, a specific example in which the stickable-curable adhesive sheet 6 is used in bonding a strain gauge 50 to a test piece 58 is described with reference to FIGS. 5A and 5B.

Figure 5A:
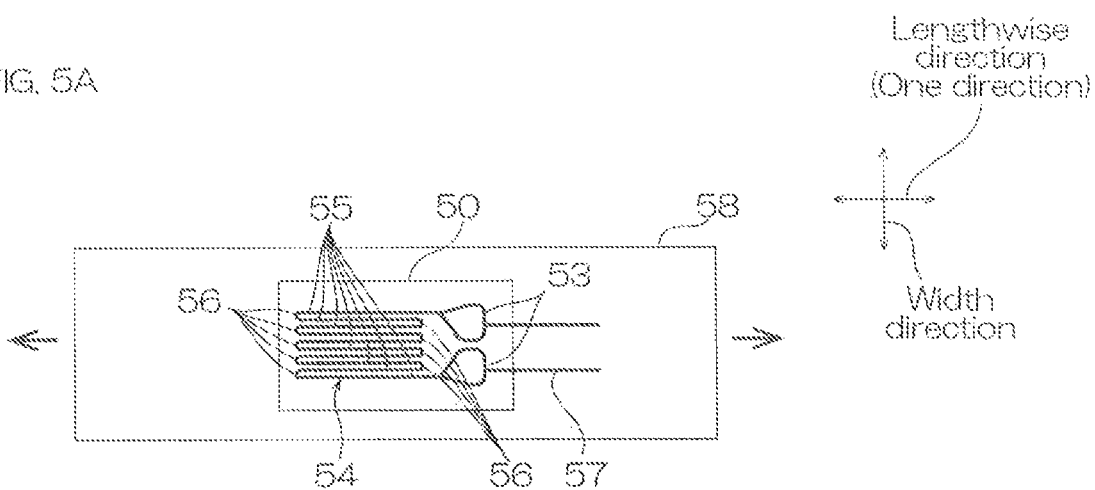
FIGS. 5A and 5B show schematic configurations for illustrating a method for detecting a strain of a test piece with a strain gauge.
Figure 5B:
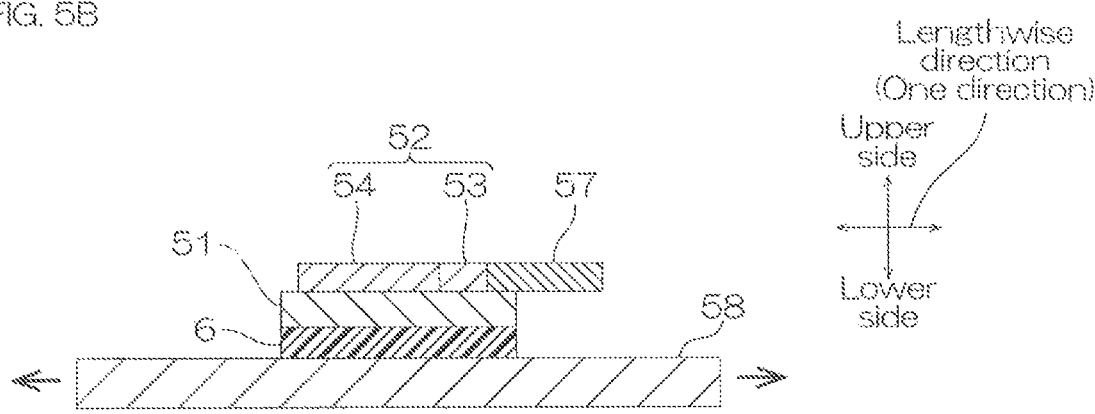

As shown in FIGS. 5A and 5B, the strain gauge 50 includes a base portion 51 and a conductive portion 52 that is provided thereon.

The base portion 51 has a generally flat plate shape extending along the plane direction, and is made of an insulating material.

The conductive portion 52 has two terminal portions 53 and a sensor pattern portion 54 that electrically connects therebetween.

The two terminal portions 53 are electrically connected to a resistance measurement portion (not shown) that is capable of measuring the electric resistance via lead wires 57.

A sensor pattern portion 54 has a plurality of linear portions 55, and a plurality of communicating portions 56 that communicate with each other between the linear portions 55 that are next to each other.

To detect an elongation strain (deformation in a lengthwise direction) of the test piece 58 by the strain gauge 50, as shown in FIG. 5B, the stickable-curable adhesive sheet 6 is interposed between the strain gauge 50 and the test piece 58, and the strain gauge 50 is bonded to the test piece 58 so that the lengthwise direction of the strain gauge 50 is along the lengthwise direction of the test piece 58.

An example of the method for bonding the strain gauge 50 to the test piece 58 by interposing the stickable-curable adhesive sheet 6 therebetween includes the above-described method.

Next, as shown by the arrows of FIGS. 5A and 5B, when the test piece 58 extends outwardly in the lengthwise direction by a tensile testing machine, the strain gauge 50 extends outwardly in the lengthwise direction. Then, the linear portions 55 extend to increase the resistance of the linear portions 55, and the amount of increase is detected by the resistance measurement portion.

In this manner, the elongation strain of the test piece 58 is detected.

Next, a specific example in which the stickable-curable adhesive sheet 6 is used in bonding a crack sensor 60 to a concrete 62 is described with reference to FIGS. 6A to 6C.

Figure 6A:
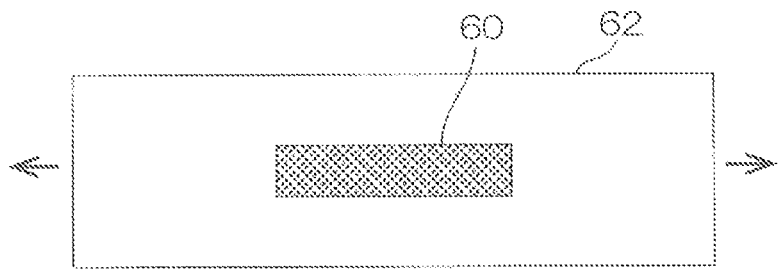
FIGS. 6A to 6C show schematic configurations for illustrating a method for detecting a crack in concrete with a crack sensor.
Figure 6B:
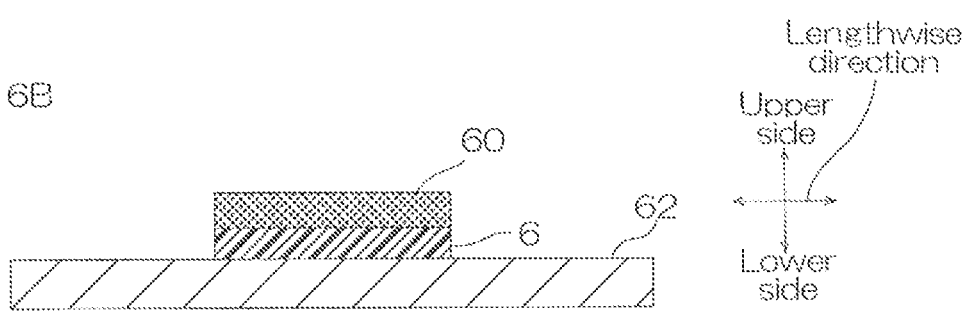

As shown in FIGS. 6A and 6B, the crack sensor 60 has a generally flat plate shape extending along the plane direction.

The crack sensor 60 is, for example, made of a plastic having properties of discoloring (whitening) when pulled in the lengthwise direction. Examples of the crack sensor 60 include transparent acrylonitrile•butadiene•styrene resin film and fluorine resin film.

To be specific, when the crack sensor 60 is pulled in the lengthwise direction, a gap occurs in the crack sensor 60, and the crack sensor 60 is whitened.

As shown in FIGS. 6A and 6B, to detect a crack in the concrete 62 by the crack sensor 60, the stickable-curable adhesive sheet 6 is interposed between the crack sensor 60 and a portion that requires to detect the crack in the concrete 62, and the crack sensor 60 is bonded to the concrete 62 so that the lengthwise direction of the crack sensor 60 is along the lengthwise direction of the concrete 62.

An example of the method for bonding the crack sensor 60 to the concrete 62 by interposing the stickable-curable adhesive sheet 6 therebetween includes the above-described method.

Figure 6C:
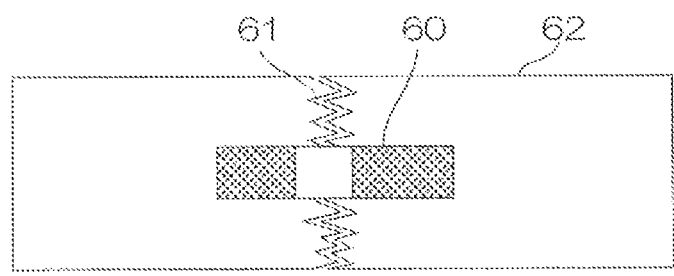

Next, as shown in FIG. 6C, when a crack 61 along a width direction occurs by pulling the concrete 62 in the lengthwise direction by a tensile testing machine, the concrete 62 extends in the lengthwise direction.

Then, the crack sensor 60 extends. In this way, the crack sensor 60 is whitened.

In this manner, the crack 61 in the concrete 62 is detected.

Lastly, a specific example in which the stickable-curable adhesive sheet 6 is used in bonding a strain visualizing member 70 to a test piece 80 is described with reference to FIGS. 7A to 7C.

Figure 7A:
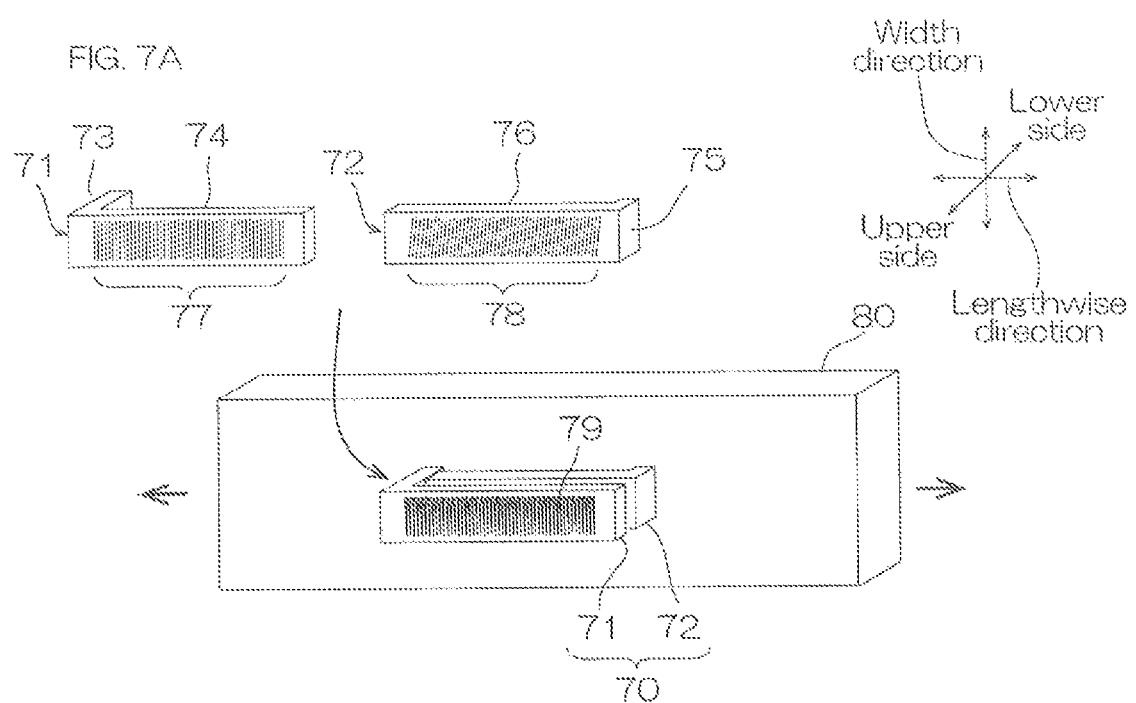
FIGS. 7A to 7C show schematic configurations for illustrating a method for detecting a strain of a test piece with a strain visualizing member.

As shown in FIG. 7A, the strain visualizing member 70 extends in the lengthwise direction, and includes a first member 71 and a second member 72 each having a striped pattern 77 and a striped pattern 78 that are different from each other, respectively.

The first member 71 is formed by disposing a first fixed portion 73 and a first stripe forming portion 74 formed with a transparent striped pattern in an L-shaped shape.

The second member 72 is formed by disposing a second fixed portion 75 and a second stripe forming portion 76 formed with an untransparent striped pattern in an L-shaped shape.

Figure 7B:
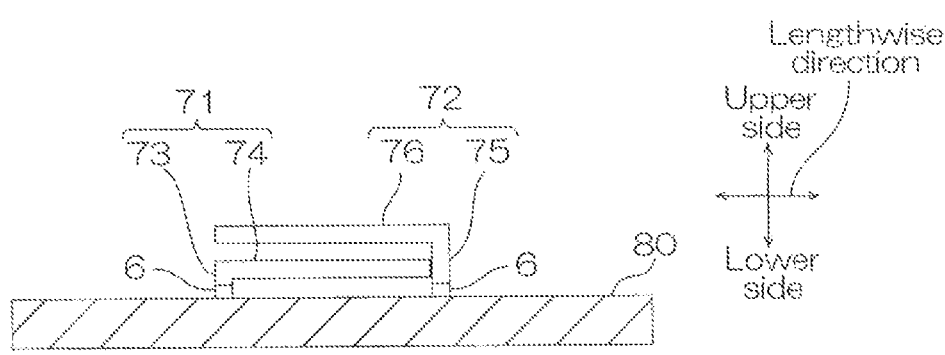

As shown in FIG. 7B, to detect an elongation strain (deformation in the lengthwise direction) of the test piece 80 by the strain visualizing member 70, the stickable-curable adhesive sheet 6 is interposed between the lower surface of the first fixed portion 73 and the lower surface of the second fixed portion 75, and a portion that requires to measure the elongation strain in the test piece 80, and the first fixed portion 73 and the second fixed portion 75 are disposed so that the first stripe forming portion 74 is overlapped with the second stripe forming portion 76 in the thickness direction, and the strain visualizing member 70 is bonded to the test piece 80 so that the lengthwise direction of the strain visualizing member 70 is along the lengthwise direction of the test piece 80.

An example of the method for bonding the strain visualizing member 70 to the test piece 80 by interposing the stickable-curable adhesive sheet 6 therebetween includes the above-described method.

Next, as shown by the arrows of FIG. 7A, when both end portions in the lengthwise direction of the test piece 80 extend outwardly by the tensile testing machine, the second fixed portion 75 is moved to the other side in the lengthwise direction, while the first fixed portion 73 is moved to one side in the lengthwise direction. Then, the first stripe forming portion 74 and the second stripe forming portion 76 deviate in the lengthwise direction.

Figure 7C:
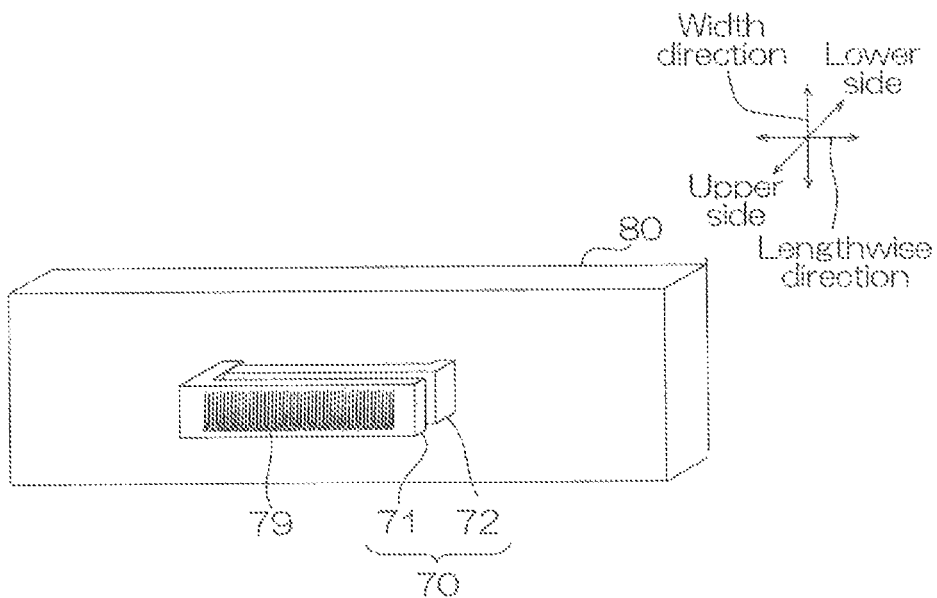

In this manner, as shown in FIG. 7C, a moire fringe 79 that is formed by the interference of the striped pattern 77 and the striped pattern 78 is, for example, moved to one side in the width direction.

In this manner, the elongation strain of the test piece 80 is detected.

<Function and Effect of Embodiment>

According to the stickable-curable adhesive sheet 6, as a sheet, it can be prepared in a uniform thickness in advance. Thus, as in a case where the adhesive is applied to the deformation/conversion device 2, a nonuniform thickness can be reduced. Thus, the deformation/conversion device 2 can be easily bonded to the adherend 4, while a reduction of the measurement accuracy of the deformation/conversion device 2 caused by unevenness in thickness can be suppressed. The stickable-curable adhesive component has the pressure-sensitive adhesiveness, so that the positioning can be performed by allowing the deformation/conversion device 2 to pressure-sensitively adhere to the adherend 4.

According to the stickable-curable adhesive sheet 6, the initial tensile elastic modulus at 25° C. after curing is $5 \times 10^8$ Pa or more, which is high, so that it can be suppressed that the deformation that occurs in the adherend 4 is relaxed by the stickable-curable adhesive sheet 6 after curing. Thus, the stickable-curable adhesive sheet 6 can surely transmit the deformation that occurs in the adherend 4 to the deformation/conversion device 2, and as a result, allow the deformation/conversion device 2 to accurately detect the deformation of the adherend 4.

EXAMPLES

In the following, the present invention is further described based on Examples and Comparative Examples. The present invention is however not limited by Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

All designations of "part" or "parts" and "%" mean part or parts by mass and % by mass, respectively, unless otherwise particularly specified in the following description.

1. Preparation of Stickable-Curable Adhesive Layer and Preparation of Curing Component Preparation Example 1

A varnish was prepared as follows: 70 parts of liquid bisphenol A epoxy resin (trade name: "jER828", manufactured by Mitsubishi Chemical Corporation) and 30 parts of solid bisphenol A epoxy resin (trade name: "jER1256", manufactured by Mitsubishi Chemical Corporation) were mixed, and methyl ethyl ketone was added thereto so that the concentration (concentration of the liquid bisphenol A epoxy resin and the solid bisphenol A epoxy resin) was 65% to be diluted, thereby obtaining the varnish. Then, the obtained varnish was applied to a release treatment surface of a polyethylene terephthalate film (trade name: "DIAFOIL MRF #38", manufactured by Mitsubishi Plastics, Inc.) that was subjected to release treatment so that the thickness thereof after drying was 20 μm, and heated and dried at 100° C. for 1 minute, thereby obtaining a stickable-curable adhesive layer. Thereafter, the stickable-curable adhesive layer was brought into contact with another polyethylene terephthalate film so as to be sandwiched between the two polyethylene terephthalate films.

Separately, as a curing component, IBM112 (1-isobutyl-2-methyl imidazole, liquid at normal temperature, manufactured by Mitsubishi Chemical Corporation) was prepared.

In this manner, a stickable-curable adhesive sheet in which a stickable-curable adhesive layer and a curing component (curing agent layer) were separately prepared was prepared.

Preparation Examples 2 to 4 and Comparative Preparation Example 1

In accordance with the mixing formulation shown in Table 1, each of the components was blended, and methyl ethyl ketone was added thereto so that the concentration (concentration of liquid bisphenol A epoxy resin, solid bisphenol A epoxy resin, and curing agent) was 70%, in the case of Preparation Examples 2 and 3, and so that the concentration (concentration of liquid bisphenol A epoxy resin, solid bisphenol A epoxy resin, acrylic polymer, cross-linking agent, curing agent, and curing accelerator) was 50%, in the case of Preparation Example 4 and Comparative Preparation Example 1 to be then diluted, thereby preparing a varnish. Then, the obtained varnish was applied to a release treatment surface of a polyethylene terephthalate film (trade name: "DIAFOIL MRF #38", manufactured by Mitsubishi Plastics, Inc.) that was subjected to release treatment so that the thickness thereof after drying was 20 μm, and heated and dried at 100° C. for 1 minute, thereby obtaining a stickable-curable adhesive sheet. Thereafter, the stickable-curable adhesive sheet was brought into contact with another polyethylene terephthalate film so as to be sandwiched between the two polyethylene terephthalate films.

In this manner, the stickable-curable adhesive sheet containing the stickable-curable adhesive component and the curing component was prepared.

Comparative Preparation Example 2

As a stickable-curable adhesive sheet, a double-sided tape was prepared.

2. Evaluation

1) Peeling Adhesive Force

Peeling Adhesive Force of Preparation Example 1

A polyethylene terephthalate film at one side of the stickable-curable adhesive layer was peeled, and a polyethylene terephthalate film (trade name: "Lumirror 25S10", manufactured by PANAC Co., Ltd,) having a thickness of 25 μm was disposed on the exposed stickable-curable adhesive layer. Next, this was cut into a piece having a width of 20 mm, and the polyethylene terephthalate film at the other side thereof was peeled, and the exposed stickable-curable adhesive layer was disposed on an aluminum board having a thickness of 2 mm. After the bonding, a 2-kg roller was reciprocated to be compressively bonded. In 30 minutes after the bonding, the peeling adhesive force was measured at a peeling angle of 90° and a peeling rate of 300 mm/min with a tensile compression testing machine (device name: "TG-1kN", manufactured by Minebea Co., Ltd.).

The results are shown in Table 1.

Peeling Adhesive Force of Examples 2 to 4 and Comparative Example 1

The peeling adhesive force of each of the stickable-curable adhesive sheets prepared in Preparation Examples 2 to 4 and Comparative Preparation Example 1 was measured within 180 minutes (before complete curing) after the preparation thereof in the same manner as in Preparation Example 1.

The results are shown in Table 1.

Peeling Adhesive Force of Comparative Example 2

The peeling adhesive force of the double-sided tape was measured in the same manner as in Preparation Example 1.

The results are shown in Table 1.

2) Initial Tensile Elastic Modulus at 25° C.

Initial Tensile Elastic Modulus at 25° C. of Example 1

A PET film at one side of the stickable-curable adhesive layer of Preparation Example 1 was peeled, separately, a curing component of Preparation Example 1 was applied to the PET film, and the curing adhesive layer was disposed.

Next, the stickable-curable adhesive layer and the curing agent layer were brought into contact with each other to react at a normal temperature and cure.

Next, the PET film was peeled and the stickable-curable adhesive layer after curing was cut into a piece having a width of 10 mm×a length of 40 mm, and the initial tensile elastic modulus at 25° C. thereof was measured at a distance between chucks of 10 mm and a tensile rate of 50 mm/min. The initial tensile elastic modulus (Pa) was obtained by an inclination of the initial part (tangent) of a deformation-strain curve.

The results are shown in Table 1.

Initial Tensile Elastic Modulus at 25° C. of Examples 2 to 4 and Comparative Example 1

The initial tensile elastic modulus at 25° C. was measured in the same manner as in Example 1, except that the stickable-curable adhesive sheet cured in accordance with the curing conditions of Table 1.

The results are shown in Table 1.

Initial Tensile Elastic Modulus at 25° C. of Comparative Example 2

The initial tensile elastic modulus at 25° C. of the double-sided tape was measured in the same manner as in Example 1.

The results are shown in Table 1.

3) Sensor Responsiveness a) Strain Gauge

Example 1

The stickable-curable adhesive layer of Preparation Example 1 was disposed in a strain gauge (manufactured by Kyowa Electronic Instruments Co., Ltd., KFG-5-120-C1-23L1M2R), and separately, the curing component of Preparation Example 1 was applied to an aluminum board (length of 180 mm, thickness of 0.5 mm) to be dried, so that the curing agent layer was disposed on the aluminum board.

Next, the stickable-curable adhesive layer was brought into contact with the curing agent layer, and the strain gauge pressure-sensitively adhered to a portion at a distance of 10 mm from the upper portion of the aluminum board.

Next, the stickable-curable adhesive layer and the curing agent layer react at the normal temperature to cure.

Next, a portion at a distance of 50 mm from the upper portion of the aluminum board was fixed, and a load of 100 g was hung from a portion at a distance of 20 mm from the lower portion thereof. In this manner, the aluminum board extended in the lengthwise direction.

Thereafter, the sensor responsiveness was measured with the strain gauge.

The results are shown in Table 1.

Examples 2 to 4 and Comparative Example 1

The sensor responsiveness was measured with the strain gauge in the same manner as in Example 1, except that the stickable-curable adhesive sheet was interposed between the strain gauge and the aluminum board; the strain gauge pressure-sensitively adhered to a portion at a distance of 100 mm from the upper portion of the aluminum board; and the stickable-curable adhesive sheet cured in accordance with the curing conditions of Table 1.

The results are shown in Table 1.

Comparative Example 2

The sensor responsiveness of the double-sided tape was measured with the strain gauge in the same manner as in Example 1.

The results are shown in Table 1.
<Evaluation>

An adhesive (manufactured by Konishi Co., Ltd., Aron Alpha) was applied to an aluminum board.

At this time, when unevenness in thickness of the adhesive occurred, the adhesive was wiped off, and the adhesive was again applied to the aluminum board. This operation was repeated until the adhesive was capable of being uniformly applied so as not to have unevenness in thickness of the adhesive.

Next, the strain gauge pressure-sensitively adhered to a portion at a distance of 100 mm from the upper portion of the aluminum board.

While the adhesive cured, the portion was covered with a polyethylene sheet and strongly pushed from the top thereof with a thumb for 1 minute.

After the adhesive cured, the sensor responsiveness was measured with the strain gauge in the same manner as in Example 1.

The evaluation was conducted as follows: a case where a strain could be detected in the same manner as in the adhesive (manufactured by Konishi Co., Ltd., Aron Alpha) was defined as "Good" and a case where a strain could not be detected in the same manner as in the adhesive (manufactured by Konishi Co., Ltd., Aron Alpha) was defined as "Bad".

b) Crack Sensor

Example 1

The stickable-curable adhesive layer of Preparation Example 1 was disposed on a crack sensor, and separately, the curing component of Preparation Example 1 was applied to a mortar board to be dried, so that the curing agent layer was disposed on the mortar board.

Next, the stickable-curable adhesive layer was brought into contact with the curing agent layer, so that the crack sensor pressure-sensitively adhered to the mortar board.

Next, the stickable-curable adhesive layer and the curing agent layer reacted at the normal temperature to cure.

The mortar board was pulled at a tensile rate of 0.05 mm/min with a tensile testing machine, and a discoloration state of the sensor in accordance with the elongation of the mortar board was observed.

<Evaluation>

An adhesive (manufactured by Konishi Co., Ltd., Aron Alpha) was applied to the mortar board.

At this time, when unevenness in thickness of the adhesive occurred, the adhesive was wiped off, and the adhesive was again applied to the mortar board. This operation was repeated until the adhesive was capable of being uniformly applied so as not to have unevenness in thickness of the adhesive.

Next, the crack sensor pressure-sensitively adhered to the mortar board.

While the adhesive cured, the crack sensor was temporarily fixed to the mortar board with a pressure-sensitive adhesive tape.

After the adhesive cured, the pressure-sensitive adhesive tape was taken out, and a discoloration state of the sensor in accordance with the elongation of the mortar board was observed in the same manner as in Example 1.

The evaluation was conducted as follows: a case where the discoloration state of the sensor could be confirmed in the same manner as in the adhesive (manufactured by Konishi Co., Ltd., Aron Alpha) was defined as "Good" and a case where the discoloration state of the sensor could not be confirmed in the same manner as in the adhesive (manufactured by Konishi Co., Ltd., Aron Alpha) was defined as "Bad"

The results are shown in Table 1.

TABLE 1

| | Mixing Ratio of Stickable-Curable Adhesive Composition | | | | | | | |
|---|---|---|---|---|---|---|---|---|
| | Stickable-Curable Adhesive Component | | | | | | | Pressure-Sensitive |
| | | Acrylic | | | Curing Component | | | |
| | | | Polymer Acrylic | Cross-Linking Agent | | Curing Agent | Curing Accelerator | Adhesive Properties Peeling Adhesive |
| | Epoxy Resin | | | | | | | |
| | jER828 | jER1256 | Polymer | Coronate L | DICY | ST-12 | DCMU | Force [N/20 mm] |
| Preparation Ex. 1 | Stickable-Curable Adhesive Sheet in which Stickable-Curable Adhesive Layer and Curing Component (Curing Adhesive Layer) are Separately Prepared | | | | | | | 3.7 |
| Preparation Ex. 2 | 70 | 30 | — | — | — | 30 | — | 3.1 |
| Preparation Ex. 3 | 70 | 30 | — | — | — | 30 | — | 3.1 |
| Preparation Ex. 4 | 37.5 | 37.5 | 25 | 2.5 | 3.75 | — | 1.5 | 1.6 |
| Comparative Preparation Ex. 1 | 52.5 | 22.5 | 25 | 2.5 | 3.75 | — | 1.5 | 2.3 |
| Comparative Preparation Ex. 2 | Double-Sided Tape | | | | | | | 10 |

TABLE 1-continued

| Stickable-Curable Adhesive Sheet | | Curing Conditions | Initial Tensile Elastic Modulus at 25° C. [Pa] | Thickness of Stickable-Curable Adhesive Sheet after Curing [μm] | Sensor Responsivenss | |
|---|---|---|---|---|---|---|
| | | | | | Strain Gauge | Crack Sensor |
| Preparation Ex. 1 | Ex. 1 | Normal Temperature | $1.3 \times 10^9$ | 40 | Good | Good |
| Preparation Ex. 2 | Ex. 2 | Normal Temperature | $1.1 \times 10^9$ | 100 | Good | — |
| Preparation Ex. 3 | Ex. 3 | Normal Temperature | $1.1 \times 10^9$ | 1000 | Good | — |
| Preparation Ex. 4 | Ex. 4 | Thermal Curing at 150° C. for 20 min | $5.6 \times 10^8$ | 50 | Good | — |
| Comparative Preparation Ex. 1 | Comp. Ex. 1 | Thermal Curing at 150° C. for 20 min | $4.8 \times 10^8$ | 20 | Bad | — |
| Comparative Preparation Ex. 2 | Comp. Ex. 2 | None | $5.5 \times 10^7$ | 160 | Bad | — |

In Table 1, the numerical values in mixing formulation column show the number of parts by mass.

In Table 1, details of the abbreviation of each of the components are given in the following.

jER828: bisphenol A epoxy resin, liquid at normal temperature (at 25° C.), viscosity (at 25° C.) of 120 Pa·s to 150 Pa·s, manufactured by Mitsubishi Chemical Corporation jER1256, high molecular weight bisphenol A epoxy resin, solid at normal temperature (at 25° C.), softening point of 85° C., manufactured by Mitsubishi Chemical Corporation Acrylic polymer: the acrylic polymer was prepared by the following steps.

A four-neck flask equipped with a stirring blade, a thermometer, a nitrogen gas introduction tube, and a cooler was charged with 100 parts of n-butyl acrylate, 0.1 parts of 2-hydroxyethyl acrylate, 3 parts of acrylic acid, and 0.1 parts of 2,2'-azobisisobutylonitrile as a polymerization initiator in addition to 100 parts of ethyl acetate and 100 parts of toluene, and a nitrogen gas was introduced, while the charged mixture was gently stirred, so that nitrogen substitution was performed for 1 hour. Thereafter, the liquid temperature at the inside of the flask was retained at around 55° C., and polymerization reaction was performed for 15 hours, so that an acrylic polymer solution having a weight average molecular weight of 600,000 was prepared.

Coronate L: isocyanate cross-linking agent

DICY: dicyandiamide, manufactured by CVC Thermoset Specialties

ST-12: amine curing agent, manufactured by Mitsubishi Chemical Corporation

DCUM: 3-(3,4-dicyclophenyl)-1,1-dimethylurea, manufactured by Hodogaya Chemical Co., Ltd.

Double-sided tape: trade name: "No. 5000NS", manufactured by Nitto Denko Corporation While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The stickable-curable adhesive sheet of the present invention is used in bonding the deformation/conversion device to the adherend.

DESCRIPTION OF REFERENCE NUMERALS

1 Stickable-curable adhesive layer
2 Deformation/conversion device
4 Adherend
5 Curing component
6 Stickable-curable adhesive sheet
7 Stickable-curable adhesive layer-including deformation/conversion device
8 Stickable-curable adhesive layer-including deformation/conversion device kit
9 Stickable-curable adhesive sheet-including deformation/conversion device

The invention claimed is:

1. A stickable-curable adhesive layer-including deformation/conversion device kit, comprising:
  a stickable-curable adhesive layer-including deformation/conversion device, comprising:
    a deformation/conversion device; and
    a stickable-curable adhesive layer bonded to the deformation/conversion device; and
  a curing component curing the stickable-curable adhesive layer,
  wherein
    the deformation/conversion device has a first side and a second side opposite to the first side,
    the stickable-curable adhesive layer is bonded to the first side of the deformation/conversion device,
    the second side of the deformation/conversion device is free from being in direct contact with the stickable-curable adhesive layer and the curing component,
    the stickable-curable adhesive layer and the curing component together form a stickable-curable adhesive sheet, and
    the initial tensile elastic modulus at 25° C. of the stickable-curable adhesive sheet after curing is $5 \times 10^8$ Pa or more.

2. The stickable-curable adhesive layer-including deformation/conversion device kit according to claim 1, wherein
  a peeling adhesive force of the stickable-curable adhesive layer at a time of peeling the stickable-curable adhesive layer from an aluminum board at 90 degrees at a rate of 300 mm/min after the stickable-curable adhesive layer containing the stickable-curable adhesive component is bonded to the aluminum board is 0.5 N/20 mm or more.

3. The stickable-curable adhesive layer-including deformation/conversion device kit according to claim 1, wherein the stickable-curable adhesive layer and the curing component cure at a normal temperature.

\* \* \* \* \*